(12) United States Patent
Tamada et al.

(10) Patent No.: US 12,318,857 B2
(45) Date of Patent: Jun. 3, 2025

(54) WELDING DETERMINATION METHOD AND SPOT WELDING EQUIPMENT

(71) Applicant: TOYOTA JIDOSHA KABUSHIKI KAISHA, Toyota (JP)

(72) Inventors: Yosuke Tamada, Toyota (JP); Kyosuke Izuno, Nisshin (JP); Tomohiko Sekiguchi, Nagakute (JP); Shuhei Ogura, Nagakute (JP); Chikaumi Sawanishi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 744 days.

(21) Appl. No.: 17/649,946

(22) Filed: Feb. 4, 2022

(65) Prior Publication Data

US 2022/0297224 A1     Sep. 22, 2022

(30) Foreign Application Priority Data

Mar. 18, 2021   (JP) ................................. 2021-045008

(51) Int. Cl.
*B23K 11/11*   (2006.01)
*B23K 11/25*   (2006.01)

(52) U.S. Cl.
CPC ............. *B23K 11/115* (2013.01); *B23K 11/25* (2013.01)

(58) Field of Classification Search
CPC ..... B23K 11/115; B23K 11/25; B23K 31/125; B23K 11/11
USPC ........................................................ 219/91.2
See application file for complete search history.

(56) References Cited

U.S. PATENT DOCUMENTS

| | | | |
|---|---|---|---|
| 11,247,292 B2 * | 2/2022 | Nomura ................ | B23K 11/255 |
| 11,292,074 B2 * | 4/2022 | Aoki ..................... | B23K 11/315 |

FOREIGN PATENT DOCUMENTS

| | | |
|---|---|---|
| CN | 111360386 A | 7/2020 |
| CN | 111699068 A | 9/2020 |
| JP | 1-228677 A | 9/1989 |
| JP | 6-63765 A | 3/1994 |
| JP | 2001-170778 A | 6/2001 |
| JP | 2006-55893 A | 3/2006 |
| JP | 2019-155389 A | 9/2019 |
| JP | 2019155389   * | 9/2019 |

(Continued)

*Primary Examiner* — Ibrahime A Abraham
*Assistant Examiner* — Joseph W Iskra
(74) *Attorney, Agent, or Firm* — Oblon, McClelland, Maier & Neustadt, L.L.P.

(57) ABSTRACT

A welding determination method is provided, which determines whether a spot welding part is joined to an electrode without using resistance generated when separating the electrode from a workpiece. In the method, the workpiece made by laminating multiple metal sheets is clamped under pressure by a pair of electrodes and melted by a current applied, and after that the conduction is stopped to hold the workpiece in a pressurized state to determine whether the joining occurs. The method includes the steps of: deriving resistance between the pair of electrodes and pressurizing force by the pair of electrodes during conduction to the workpiece; and determining whether the spot welding part is joined to the electrodes based on a first index value calculated using the derived resistance and resistance in an ideal welding, and on a second index value calculated using the derived pressurizing force and pressurizing force in the ideal welding.

4 Claims, 7 Drawing Sheets

(56) References Cited

FOREIGN PATENT DOCUMENTS

JP       2020-157316 A    10/2020
JP        2020157316   * 10/2020

* cited by examiner

WELDING DETERMINATION METHOD AND SPOT WELDING EQUIPMENT

CROSS-REFERENCE TO RELATED APPLICATIONS

The present application claims priority under 35 U.S.C. § 119(a) to Japanese Patent Application No. 2021-045008, filed on Mar. 18, 2021. The contents of this application are incorporated herein by reference in its entirety.

TECHNICAL FIELD

The present invention relates to a welding determination method and spot welding equipment.

BACKGROUND ART

Conventionally, spot welding equipment is known, which welds a workpiece made by laminating a plurality of metal sheet (for example, see Patent Document 1). The spot welding equipment clamps a workpiece under pressure by a pair of electrodes and applies a current to the workpiece using the pair of electrodes so that the workpiece is melted. After that, application of the current to the workpiece is stopped, and the workpiece is held in the pressurized state. Thus, a spot welding part is formed in the workpiece.

The spot welding equipment disclosed in Patent Document 1 is capable of detecting joining of the spot welding part to the electrode. Specifically, the spot welding equipment detects whether the joining occurs or not based on resistance that acts on the electrode when the electrode is separated from the workpiece after the spot welding part is formed.

PRIOR ART DOCUMENT

Patent Document

[Patent Document 1] JP 2001-170778 A

SUMMARY OF THE INVENTION

Problem to be Solved by the Invention

However, in the conventional spot welding equipment as described above, although the joining of the spot welding part to the electrode can be detected, the electrode may fall out of the welding gun by the resistance acting on the electrode when the joining actually occurs.

The present invention was made in consideration of the above circumstances, an object of which is to provide a welding determination method and spot welding equipment, with which joining of the spot welding part to the electrode can be determined without using the resistance generated when the electrode is separated from the workpiece.

Means for Solving the Problem

A welding determination method of the present invention is for determining whether a spot welding part formed in a workpiece is joined to either or both of a pair of electrodes. The workpiece made by laminating a plurality of metal sheets is clamped under pressure by the pair of electrodes so as to be melted by a current applied using the pair of electrodes, and after that the application of the current to the workpiece is stopped to hold the workpiece in a pressurized state. The welding determination method includes the steps of: deriving resistance between the pair of electrodes as well as pressurizing force by the pair of electrodes at a time of applying the current to the workpiece using the pair of electrodes; and determining whether the spot welding part is joined to either or both of the pair of electrodes based on a first index value calculated using the derived resistance and resistance when an ideal welding is performed, and also based on a second index value calculated using the derived pressurizing force and pressurizing force when the ideal welding is performed.

Here, when the welding is performed while the joining occurs between the spot welding part and the electrode, spatters (expulsions) are generated due to excessive heat input derived from increased resistance, and then the thickness of the workpiece decreases because of generation of the spatters, which results in decrease in the pressurizing force. Thus, the first index value related to the resistance and the second index value related to the pressurizing force at the time of the spot welding are calculated and used to determine whether the joining occurs or not. In this way, it is possible to determine whether the joining of the spot welding part to the electrode occurs or not without relying on the resistance generated when the electrode is separated from the workpiece.

In the above-described welding determination method, an electrode position at the time of applying the current to the workpiece using the pair of electrodes may be derived, and it may be determined whether the spot welding part is joined to either or both of the pair of electrodes based on a third index value calculated using the derived electrode position and an electrode position when the ideal welding is performed, in addition to the first index value and the second index value.

In the above-described welding determination method using the third index value, the first index value may be an integrated value of a difference between the derived resistance and the resistance when the ideal welding is performed in a predetermined first time period, the second index value may be an integrated value of a difference between the derived pressurizing force and the pressurizing force when the ideal welding is performed in a predetermined second time period, and the third index value may be an integrated value of a difference between the derived electrode position and the electrode position when the ideal welding is performed in a predetermined third time period.

In this case, the second time period may be the same time period as the third time period while the first time period may be shorter than the second time period and the third time period.

In the above-described welding determination method, it may be determined whether the spot welding part is joined to either or both of the pair of electrodes when the application of the current to the workpiece is stopped and the workpiece is held in the pressurized state.

Spot welding equipment of the present invention includes a pair of electrodes applying a current to a workpiece made by laminating a plurality of metal sheets. The workpiece is clamped under pressure by the pair of electrodes so as to be melted by a current applied by the pair of electrodes, and after that the application of the current to the workpiece is stopped to hold the workpiece in a pressurized state, so that a spot welding part is formed in the workpiece. The spot welding equipment further includes: a derivation part deriving resistance between the pair of electrodes as well as pressurizing force by the pair of electrodes at a time of applying the current to the workpiece using the pair of electrodes; and a determination part determining whether the spot welding part is joined to either or both of the pair of electrodes based on a first index value calculated using the derived resistance and resistance when an ideal welding is performed, and also based on a second index value calculated using the derived pressurizing force and pressurizing force when the ideal welding is performed.

Advantageous Effect of the Invention

With the welding determination method and the spot welding equipment of the present invention, the joining of the spot welding part to the electrode can be determined without using the resistance generated when the electrode is separated from the workpiece.

DESCRIPTION OF EMBODIMENTS

Hereinafter, embodiments of the present invention will be described.

First Embodiment

Figure 1:
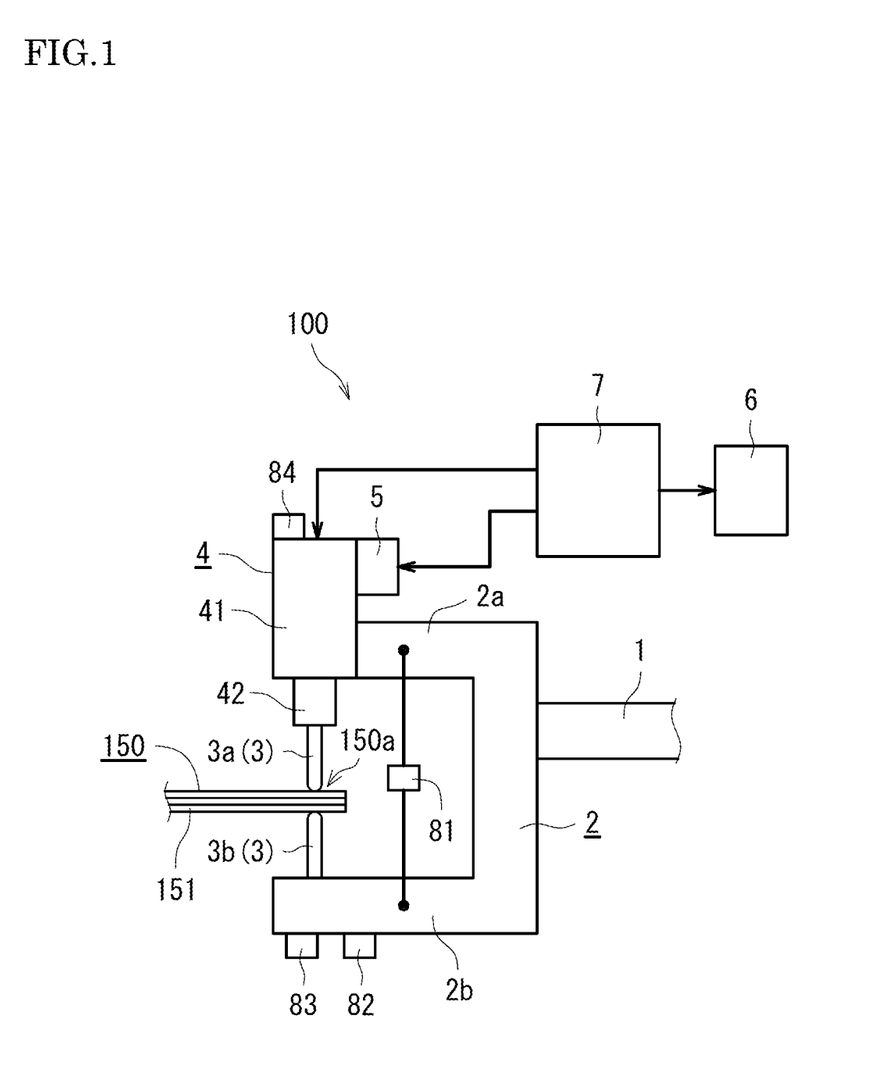
FIG. 1 is a diagram indicating a configuration of spot welding equipment.

First, a configuration of spot welding equipment 100 according to the first embodiment of the present invention is described with reference to FIGS. 1 and 2.

The spot welding equipment 100 is to spot-weld a workpiece 150. The workpiece 150 is constituted of a plurality of laminated metal sheets 151. For example, the metal sheet 151 is a steel sheet, and the workpiece 150 is constituted of three metal sheets 151. As shown in FIG. 1, the spot welding equipment 100 includes: a robot arm 1; a welding gun 2; a pair of electrodes 3; an electrode lifting device 4; and a current regulator 5.

The welding gun 2 is attached to an end part of the robot arm 1. The robot arm 1 is disposed to move the welding gun 2. That is, the position and posture of the welding gun 2 can be adjusted by the robot arm 1.

The welding gun 2 includes an upper part 2a and a lower part 2b. The pair of electrodes 3 is constituted of an upper electrode 3a and a lower electrode 3b that are disposed to face each other. The electrode lifting device 4 is attached to the upper part 2a, and the upper electrode 3a is attached to the electrode lifting device 4. The lower electrode 3b is attached to the lower part 2b so as to protrude upward. Therefore, the upper electrode 3a is a movable electrode while the lower electrode 3b is a fixed electrode.

The electrode lifting device 4 includes a servomotor 41 and a lifting member 42 that is lifted and lowered by the servomotor 41. The upper electrode 3a is provided on the lifting member 42 so as to protrude downward. The lifting member 42 is lowered by the servomotor 41, and thus the workpiece 150 is clamped between the pair of electrodes 3.

The current regulator 5 is capable of applying current to the workpiece 150 when the workpiece 150 is sandwiched between the pair of electrodes 3. The current regulator 5 is also capable of adjusting the current (welding current) to be applied between the pair of electrodes 3.

In the spot welding equipment 100, the pair of electrodes 3 clamps and pressurizes the workpiece 150, and applies a current to melt the workpiece 150. After that, application of the current to the workpiece 150 is stopped, and the workpiece 150 is held in a pressurized state so as to form a spot welding part 150a in the workpiece 150. Specifically, the spot welding equipment 100 spot-welds the workpiece 150 under welding conditions depending on the workpiece 150. The welding conditions include: pressurizing force applied by the pair of electrodes 3; a welding current applied to the workpiece 150; conduction time from the start to the stop of applying the current; and holding time for which the workpiece 150 is held under pressure after stopping the application of the current.

Also, the spot welding equipment 100 is capable of determining joining of the spot welding part 150a to the electrode 3. The joining of the spot welding part 150a to the electrode 3 includes: joining of the spot welding part 150a only to the upper electrode 3a; joining of the spot welding part 150a only to the lower electrode 3b; and joining of the spot welding part 150a to both the upper electrode 3a and the lower electrode 3b. The spot welding equipment 100 includes an alarm device 6 and a control device 7.

The alarm device 6 notifies a user of the joining when it occurs between the spot welding part 150a and the electrode 3. The control device 7 controls the spot welding equipment 100. Specifically, the control device 7 adjusts the position and the posture of the welding gun 2 using the robot arm 1. Also, the control device 7 controls the electrode lifting device 4 and the current regulator 5 such that the workpiece 150 is spot-welded under the welding conditions according to the workpiece 150. Furthermore, the control device 7 determines whether the joining of the spot welding part 150a to the electrode 3 occurs or not during the spot welding, and if it is determined that the joining occurs, the control device 7 notifies the alarm device 6 of the determination result.

Figure 2:
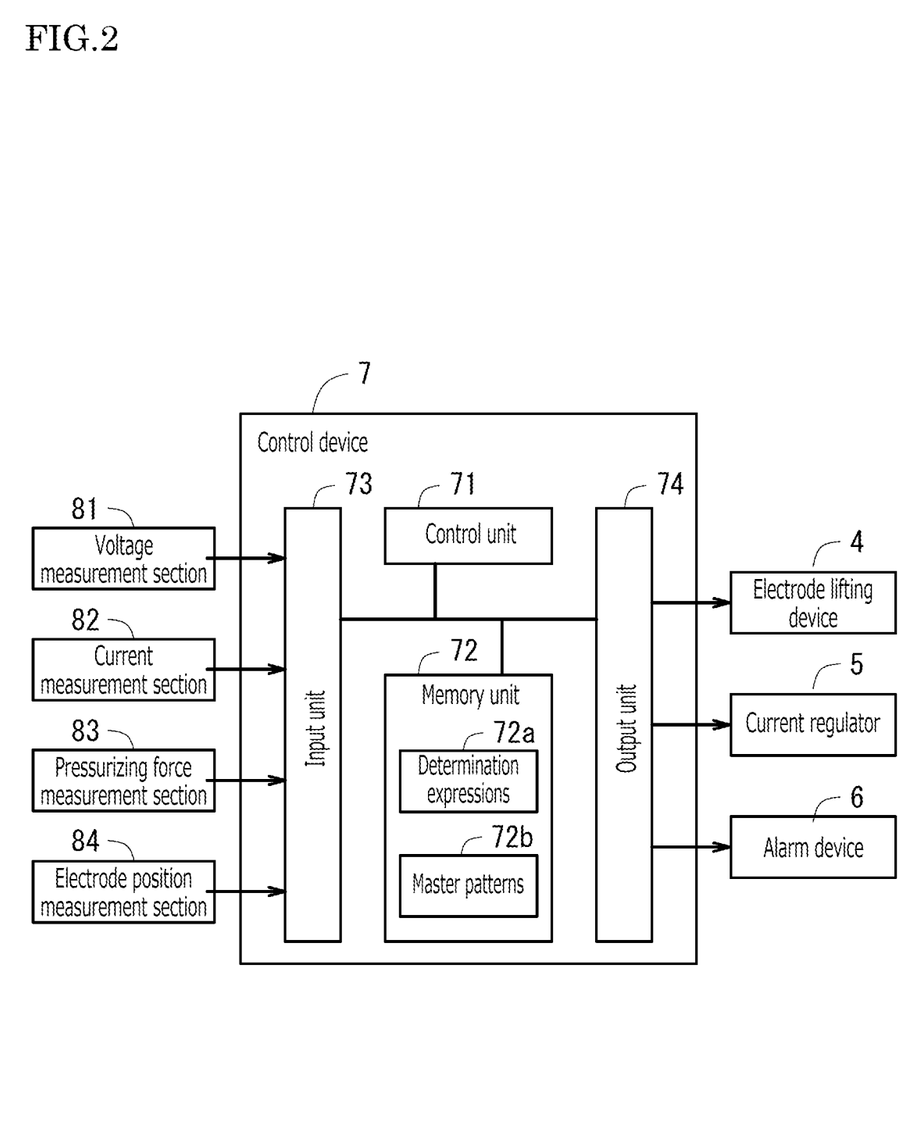
FIG. 2 is a block diagram indicating a control device of the spot welding equipment of FIG. 1.

Also as shown in FIG. 2, the control device 7 includes: a control part 71; a memory part 72; an input part 73; and an output part 74. The control part 71 controls the control device 7. The control part 71 is an example of the "derivation part" and the "determination part" of the present invention. The memory part 72 stores determination expressions 72a, master patterns 72b and the like, as described later.

To the input part 73 are connected a voltage measurement section 81, a current measurement section 82, a pressurizing force measurement section 83, an electrode position measurement section and the like. The measurement results by the above measurement sections are input to the input part 73. The voltage measurement section 81 is provided to measure the voltage between the pair of electrodes 3, and the current measurement section 82 is provided to measure the welding current applied to the workpiece 150. The control part 71 calculates the resistance between the pair of electrodes 3 based on the respective measurement results by the voltage measurement section 81 and the current measurement section 82. The pressurizing force measurement section 83 is provided to measure the pressurizing force by the pair of electrodes 3. The pressurizing force measurement section 83 is, for example, a strain sensor, which is provided on the lower part 2*b* of the welding gun 2. The electrode position measurement section 84 is provided to measure the position of the upper electrode 3*a*. The electrode position measurement section 84 is, for example, an encoder that detects the rotation angle position of the output shaft of the servomotor 41.

To the output part 74 are connected the electrode lifting device 4, the current regulator 5, the alarm device 6 and the like. The output part 74 outputs control signals to the electrode lifting device 4, the current regulator 5, the alarm device 6 and the like. The control part 71 controls the electrode lifting device 4, the current regulator 5 and the alarm device 6 based on the inputs from the respective measurement sections.

—Welding Determination Method—

Next, a welding determination method using the spot welding equipment 100 according to the first embodiment is described with reference to FIGS. 3 to 6.

Here, when the welding is performed while the joining occurs between the spot welding part 150*a* and the electrode 3, spatters (expulsions) are generated due to excessive heat input derived from increased resistance, and then the thickness of the workpiece 150 decreases because of generation of the spatters, which results in decrease of the pressurizing force. Thus, in the first embodiment, it is determined whether the joining occurs or not using the resistance and the pressurizing force at the time of the spot welding.

Figure 3:
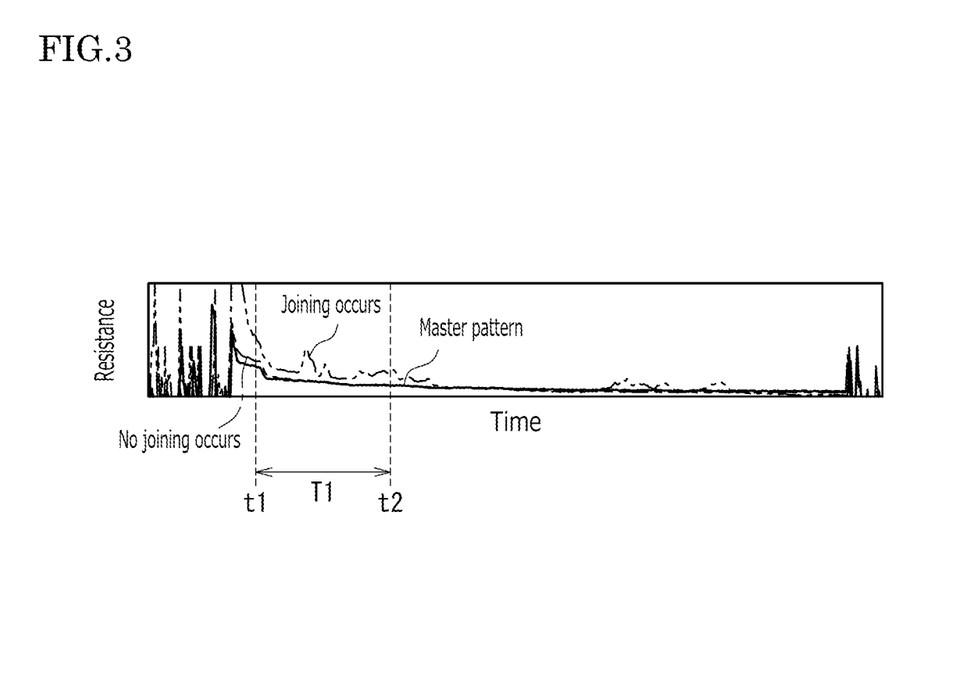
FIG. 3 is a graph indicating an example of time-based change of the resistance during spot welding.
Figure 4:
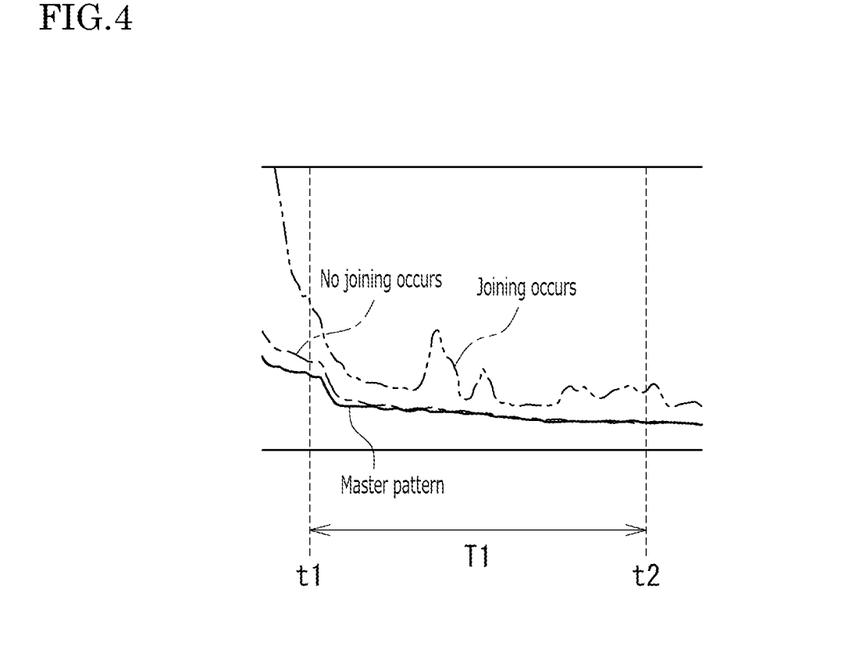
FIG. 4 is a graph enlarging a part corresponding to the time period T1 of FIG. 3.

FIG. 3 is a graph indicating: the time-based change (master pattern) of the resistance during conduction time when the ideal welding is performed; an example of the time-based change of the resistance during conduction time when the welding is performed while the joining occurs; and an example of the time-based change of the resistance during conduction time when the welding is performed while no joining occurs. FIG. 4 is a graph enlarging a part corresponding to the time period T1 of FIG. 3. The master pattern is a wave pattern in the ideal state without any disturbances, which is set in advance.

As shown in FIGS. 3 and 4, when the joining occurs, the resistance increases in the initial stage of the conduction time compared to the master pattern due to jamming of foreign matter and the like. On the other hand, when no joining occurs, the wave pattern is more similar to the master pattern than the case where the joining occurs is. Therefore, the deviation from the master pattern in the resistance in the initial stage of the conduction time is used as one of the indices to determine whether the joining occurs or not.

Figure 5:
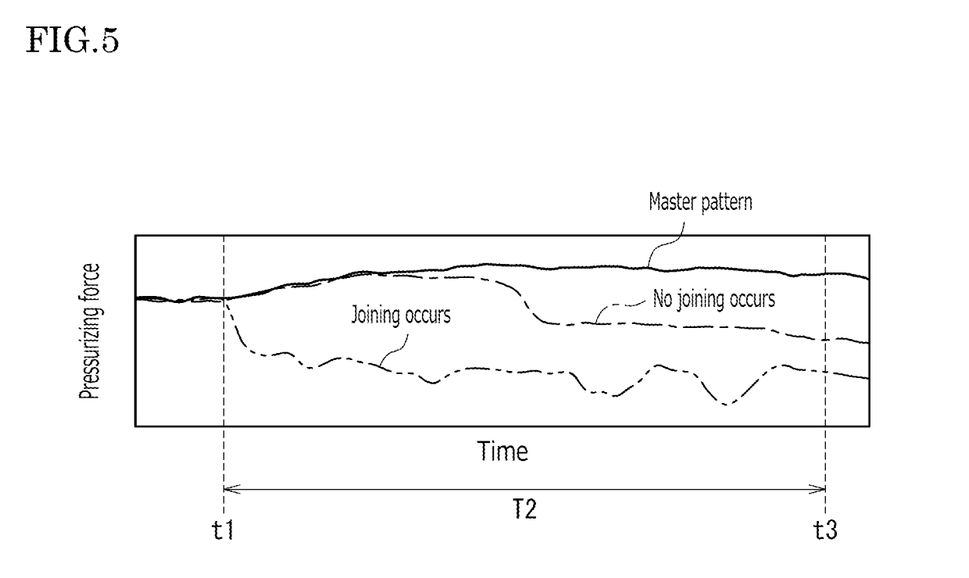
FIG. 5 is a graph indicating an example of time-based change of the pressurizing force during spot welding.

FIG. 5 is a graph indicating: the time-based change (master pattern) of the pressurizing force during conduction time when the ideal welding is performed; an example of the time-based change of the pressurizing force during conduction time when the welding is performed while the joining occurs; and an example of the time-based change of the pressurizing force during conduction time when the welding is performed while no joining occurs. The master pattern is a wave pattern in the ideal state without any disturbances, which is set in advance.

As shown in FIG. 5, when the joining occurs, the pressurizing force decreases, unlike the master pattern, because the thickness of the workpiece 150 decreases due to generation of spatters. On the other hand, when no joining occurs, the wave pattern is more similar to the master pattern than the case where the joining occurs is. Therefore, the deviation from the master pattern in the pressurizing force is used as one of the indices to determine whether the joining occurs or not.

In particular, it is determined whether the joining occurs or not using the determination expressions (1) and (2) specified below. That is, a determination value Y1 is calculated using the expression (1), and then, when the expression (2) is true, it is determined that the joining occurs.

[Mathematical 1]

$$Y1 = a1 \times \int_{t1}^{t2}(R(t)-R_M(t))dt + b1 \times \int_{t1}^{t3}(F(t)-F_M(t))dt \qquad (1)$$

$$Y1 > n1 \qquad (2)$$

In the expression (1), R(t) represents the resistance calculated at the time of the spot welding, and $R_M(t)$ represents the master pattern of the resistance. F(t) represents the pressurizing force measured at the time of the spot welding, and $F_M(t)$ represents the master pattern of the pressurizing force. Predetermined coefficients are respectively represented by a1 and b1. For example, a1 is a positive value, and b1 is a negative value. A predetermined determination threshold is represented by n1 in the expression (2). The memory part 72 of the control device 7 stores the determination expressions (1) and (2), and the respective master patterns of the resistance and the pressurizing force.

That is, an integrated value of the difference between the calculated resistance and the master pattern in a time period T1 during the conduction time (see FIG. 4) is calculated as a first index value. The time period T1 is a predetermined time period from a time point t1 to a time point t2, and it is set, for example, at the initial stage of the conduction time. Also, an integrated value of the difference between the measured pressurizing force and the master pattern in a time period T2 during the conduction time (see FIG. 5) is calculated as a second index value. The time period T2 is a predetermined time period from the time point t1 to a time point t3. For example, it is a time period from the initial stage to the final stage of the conduction time. Then, the determination value Y1 is calculated using the first index value and the second index value, and the thus calculated determination value Y1 is compared to a determination threshold n1 so as to determine whether the joining occurs or not.

The time period T1 is shorter than the time period T2. For example, the starting time point t1 of the time period T1 and of the time period T2 is set at the same time, and the ending time point t2 of the time period T1 comes earlier than the ending time point t3 of the time period T2. Also, the time period T1 is an example of the "first time period" of the present invention, and the time period T2 is an example of the "second time period" of the present invention.

Figure 6:
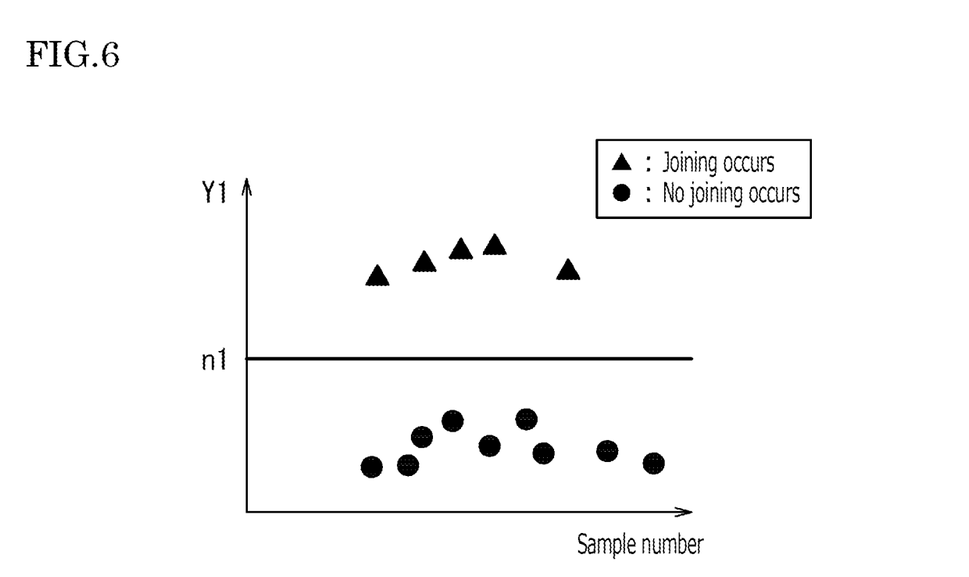
FIG. 6 is a schematic graph for explaining determination expressions.

Here, the coefficients a1 and b1 and the determination threshold n1 are calculated using: the values of the resistance and the pressurizing force when the joining occurred at the times of the previous welding; and the values of the resistance and the pressurizing force when no joining occurred at the times of the previous welding. More specifically, the coefficients a1 and b1 are set in order to distinguish a set of data when the joining occurs from a set of data when no joining occurs, and the determination threshold n1 is set as an intermediate value between the set of data when the joining occurs and the set of data when no joining occurs. For example, the graph in FIG. 6 is plotted with the sample number of the previous data on the horizontal axis and the determination value Y1 of the data of the sample on the vertical axis. As can be seen from this graph, the determination values Y1 of the samples when the joining occurs are larger than the determination threshold n1 while the determination values Y1 of the samples when no joining occurs are smaller than the determination threshold n1. Thus, it is possible to determine whether the joining occurs or not using the above-described determination expressions (1) and (2).

—Operations in Spot Welding—

Here, the operations of the spot welding equipment 100 at the time of the spot welding according to the first embodiment will be described with reference to FIG. 7. The operations of the spot welding are started after the welding gun 2 is disposed, by the robot arm 1, at a predetermined position in a predetermined posture with respect to the workpiece 150. The steps as described below are performed by the control part 71 of the control device 7.

Figure 7:
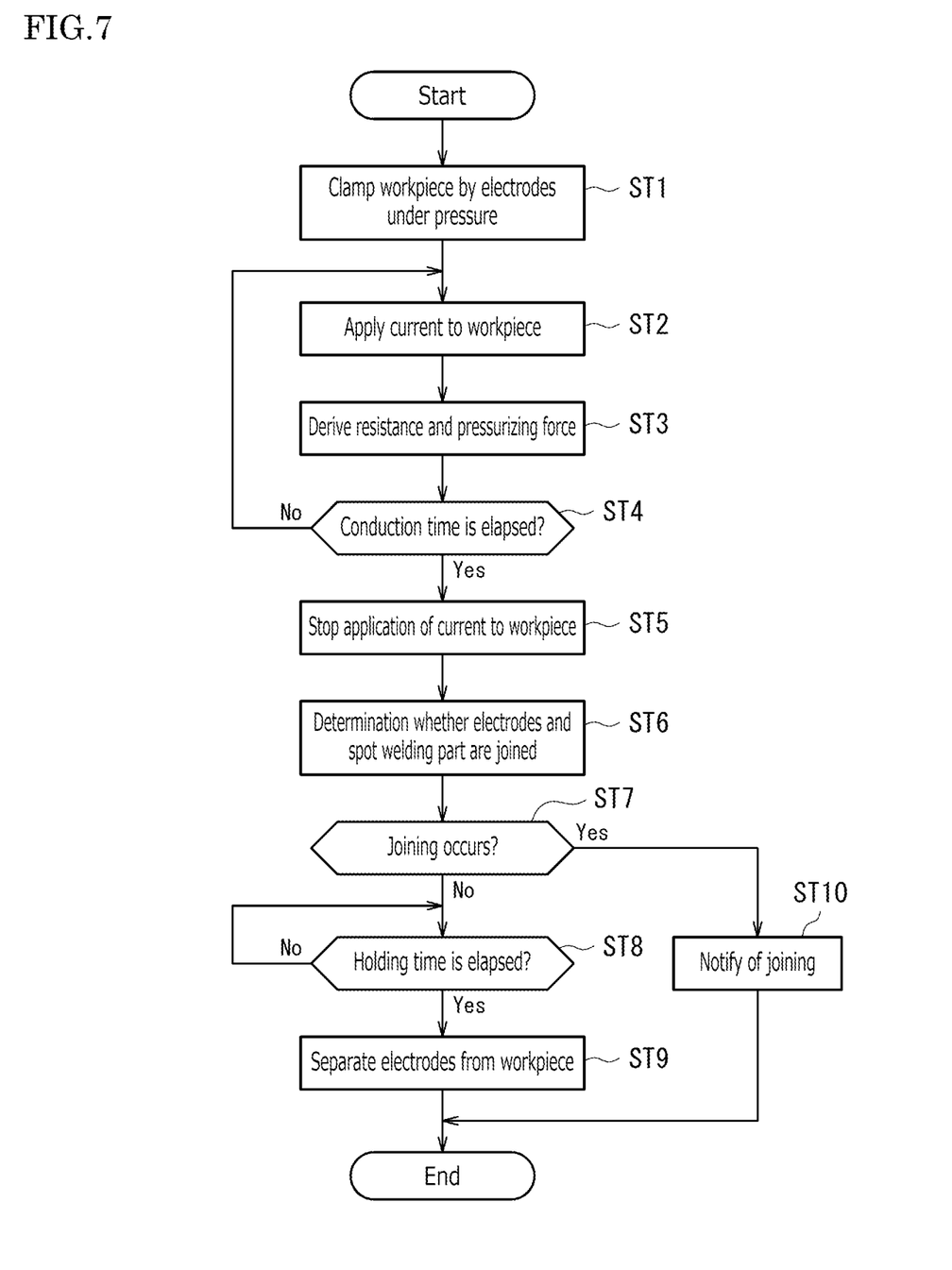
FIG. 7 is a flowchart for explaining operations of the spot welding equipment during the spot welding according to the first embodiment.

First, in step ST1 as shown in FIG. 7, the servomotor 41 of the electrode lifting device 4 is driven and the upper electrode 3a is lowered. Thus, the workpiece 150 is clamped and pressurized by the pair of electrodes 3. The servomotor 41 is controlled such that the pressurizing force applied by the pair of electrodes 3 corresponds to the value that is set according to the welding conditions (pressurizing force).

Next, in step ST2, the current regulator 5 applies a current to the workpiece 150. The current regulator 5 is controlled such that the welding current applied to the workpiece 150 corresponds to the value that is set according to the welding conditions (welding current). Thus, Joule heat is generated in the workpiece 150 to increase the temperature of the workpiece 150. As a result, the workpiece 150 is melted.

Next, in step ST3, the resistance and the pressurizing force are derived. Specifically, a voltage between the pair of electrodes 3 is measured by the voltage measurement section 81 while the welding current is measured by the current measurement section 82. Then, the resistance is calculated based on the measurement results by the voltage measurement section 81 and the current measurement section 82. Furthermore, the pressurizing force applied by the pair of electrodes 3 is measured by the pressurizing force measurement section 83.

Next, in step ST4, it is judged whether the conduction time is elapsed or not. That is, it is judged whether the elapsed time after starting conduction exceeds the value that is set according to the welding conditions (conduction time). When it is judged that the conduction time has passed, the procedure advances to step ST5. On the other hand, when it is judged that the conduction time has not passed yet, the procedure returns to step ST2. In this way, application of the current to the workpiece 150 and derivation of the resistance and the pressurizing force are continuously performed until the conduction time is elapsed.

Next, in step ST5, the application of the current to the workpiece 150 by the current regulator 5 is stopped.

Next, in step ST6, it is determined whether the joining of the spot welding part 150a to the electrode 3 occurs or not. This joining determination is performed using the above-described determination expressions (1) and (2). Specifically, the first index value is calculated by the resistance calculated in step ST3 and the master pattern of the resistance stored in the memory part 72. The first index value is an integrated value of the difference between the calculated resistance and the master pattern in the time period T1 (see FIG. 4). Also, the second index value is calculated by the pressurizing force measured in step ST3 and the master pattern of the pressurizing force stored in the memory part 72. The second index value is an integrated value of the difference between the measured pressurizing force and the master pattern in the time period T2 (see FIG. 5). Then, the determination value Y1 is calculated using the first index value and the second index value. Thus, when the determination value Y1 is larger than the determination threshold n1, it is determined that the spot welding part 150a is joined to the electrode 3. When the determination value Y1 is not more than the determination threshold n1, it is determined that the spot welding part 150a is not joined to the electrode 3.

Next, in step ST7, it is judged whether the joining occurs or not. When it is judged that the joining does not occur (no joining), the procedure advances to step ST8. On the other hand, when it is judged that the joining occurs, the procedure advances to step ST10.

Next, in step ST8, it is judged whether the holding time is elapsed or not. Specifically, it is judged whether the elapsed time after stopping conduction exceeds the value that is set according to the welding conditions (holding time). When it is judged that the holding time has passed, the procedure advances to step ST9. On the other hand, when it is judged that the holding time has not passed yet, the procedure in step ST8 is repeatedly performed. In this way, the spot welding equipment 100 remains in a stand-by state in which the workpiece 150 is pressurized by the pair of electrodes 3 until the holding time is elapsed. Thus, the molten metal is cooled and solidified, accordingly, the spot welding part 150a having a nugget is formed.

Next, in step ST9, the servomotor 41 of the electrode lifting device 4 is driven and the upper electrode 3a is lifted. Also, the welding gun 2 is moved by the robot arm 1. Thus, the pair of electrodes 3 separates from the workpiece 150. In this case, since the electrode 3 is not joined to the spot welding part 150a, the electrode 3 does not fall out of the welding gun 2, and furthermore the workpiece 150 is not pulled by the welding gun 2. Thus, the procedure of the spot welding is terminated.

Also, in step ST10, the judgement of occurrence of joining is notified to the alarm device 6, and the alarm device 6 alarms a user about the joining. In this case, the spot welding is terminated (emergency stop) without the pair of electrodes 3 being separated from the workpiece 150. After the emergency stop, the user performs restoration work.

—Effects—

In the first embodiment as described above, the first index value related to the resistance as well as the second index value related to the pressurizing force at the time of the spot welding are calculated and used to determine whether the joining occurs or not. Thus, it is possible to determine whether the joining of the spot welding part 150a to the electrode 3 occurs or not without relying on the resistance generated when the electrode 3 is separated from the workpiece 150.

Also, in the first embodiment, the joining determination is performed within the holding time, and when it is judged that the joining occurs, the equipment is urgently stopped. Thus, the electrode 3 is prevented from falling out of the welding gun 2 while the workpiece 150 is prevented from being pulled by the welding gun 2.

Second Embodiment

Here, the welding determination method using the spot welding equipment 100 according to the second embodiment of the present invention is described with reference to FIG. 8. Note that the configuration of the spot welding equipment 100 according to the second embodiment is substantially the same as that in the first embodiment.

Here, when the welding is performed while the joining occurs between the spot welding part 150*a* and the electrode 3, spatters (expulsions) are generated due to excessive heat input derived from increased resistance, as described above. Thus, the thickness of the workpiece 150 decreases because of generation of the spatters, which results in decrease of the pressurizing force. Furthermore, change of the electrode position (i.e. downward movement of the upper electrode 3*a*) is caused by the decrease in the thickness of the workpiece 150. Thus, in the second embodiment, it is determined whether the joining occurs or not also using the electrode position, in addition to the resistance and the pressurizing force, at the time of the spot welding.

Figure 8:
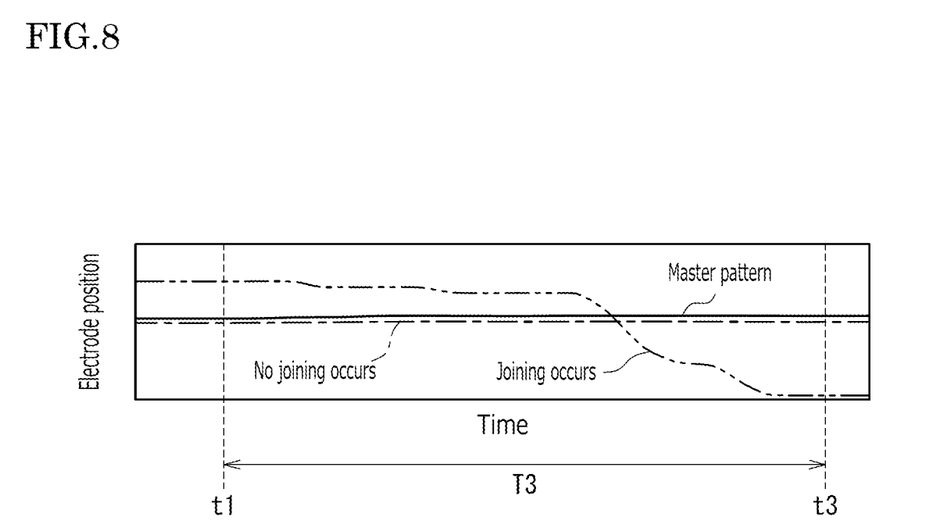
FIG. 8 is a graph indicating an example of time-based change of the electrode position during spot welding.

FIG. 8 is a graph indicating: the time-based change (master pattern) of the position of the upper electrode 3*a* during conduction time when the ideal welding is performed; an example of the time-based change of the position of the upper electrode 3*a* during conduction time when the welding is performed while the joining occurs; and an example of the time-based change of the position of the upper electrode 3*a* during conduction time when the welding is performed while no joining occurs. The master pattern is a wave pattern in the ideal state without any disturbances, which is set in advance.

As shown in FIG. 8, when the joining occurs, the upper electrode 3*a* moves downward (generation of electrode displacement), unlike the master pattern, because the thickness of the workpiece 150 decreases due to generation of spatters. On the other hand, when no joining occurs, the wave pattern is more similar to the master pattern than the case where the joining occurs is. Therefore, the deviation from the master pattern in the electrode position is used as one of the indices to determine whether the joining occurs or not.

In particular, it is determined whether the joining occurs or not using the determination expressions (3) and (4) specified below. That is, a determination value Y2 is calculated using the expression (3), and then, when the expression (4) is true, it is determined that the joining occurs.

[Mathematical 2]

$$Y2 = a2 \times \int_{t1}^{t2}(R(t)-R_M(t))dt + b2 \times \int_{t1}^{t3}(F(t)-F_M(t))dt + c2 \times \int_{t1}^{t3}(S(t)-S_M(t))dt \quad (3)$$

$$Y2 > n2 \quad (4)$$

In the expression (3), R(t) represents the resistance calculated at the time of the spot welding, and $R_M(t)$ represents the master pattern of the resistance. F(t) represents the pressurizing force measured at the time of the spot welding, and $F_M(t)$ represents the master pattern of the pressurizing force. S(t) represents the electrode position measured at the time of the spot welding, and $S_M(t)$ represents the master pattern of the electrode position. Predetermined coefficients are respectively represented by a2, b2 and c2. For example, a2 is a positive value, and b2 and c2 are negative values. A predetermined determination threshold is represented by n2 in the expression (4). The memory part 72 of the control device 7 stores the determination expressions (3) and (4), and the respective master patterns of the resistance, the pressurizing force and the electrode position.

That is, an integrated value of the difference between the calculated resistance and the master pattern in the time period T1 during the conduction time (see FIG. 4) is calculated as the first index value. The time period T1 is a predetermined time period from the time point t1 to the time point t2, and it is set, for example, at the initial stage of the conduction time. Also, an integrated value of the difference between the measured pressurizing force and the master pattern in the time period T2 during the conduction time (see FIG. 5) is calculated as the second index value. The time period T2 is a predetermined time period from the time point t1 to the time point t3. For example, it is a time period from the initial stage to the final stage of the conduction time. Furthermore, an integrated value of the difference between the measured electrode position and the master pattern in a time period T3 during the conduction time (see FIG. 8) is calculated as a third index value. The time period T3 is a predetermined time period from the time point t1 to the time point t3, and for example, it is the same time period as the time period T2. Then, the determination value Y2 is calculated using the third index value in addition to the first index value and the second index value, and the thus calculated determination value Y2 is compared to the determination threshold n2 so as to determine whether the joining occurs or not. The time period T3 is an example of the "third time period" of the present invention.

Here, the coefficients a2, b2 and c2 and the determination threshold n2 are calculated using: the values of the resistance, the pressurizing force and the electrode position when the joining occurred at the times of the previous welding; and the values of the resistance, the pressurizing force and the electrode position when no joining occurred at the times of the previous welding. More specifically, the coefficients a2, b2 and c2 are set in order to distinguish a set of data when the joining occurs from a set of data when no joining occurs, and the determination threshold n2 is set as an intermediate value between the set of data when the joining occurs and the set of data when no joining occurs. In the second embodiment, it is possible to have a larger interval between the set of data when the joining occurs and the set of data when no joining occurs compared to the case in the first embodiment, which contributes to improvement of accuracy in the joining determination.

—Operations in Spot Welding—

Here, the operations of the spot welding equipment 100 at the time of the spot welding according to the second embodiment will be described with reference to FIG. 9. The operations of the spot welding are started after the welding gun 2 is disposed, by the robot arm 1, at a predetermined position in a predetermined posture with respect to the workpiece 150. The steps as described below are performed by the control part 71 of the control device 7. Also, since the respective operations in steps ST11, ST12, ST14, ST15, ST17, ST18, ST19 and ST20 are the same as those in steps ST1, ST2, ST4, ST5, ST7, ST8, ST9 and ST10 in FIG. 7, the description related to the above steps is omitted here.

Figure 9:
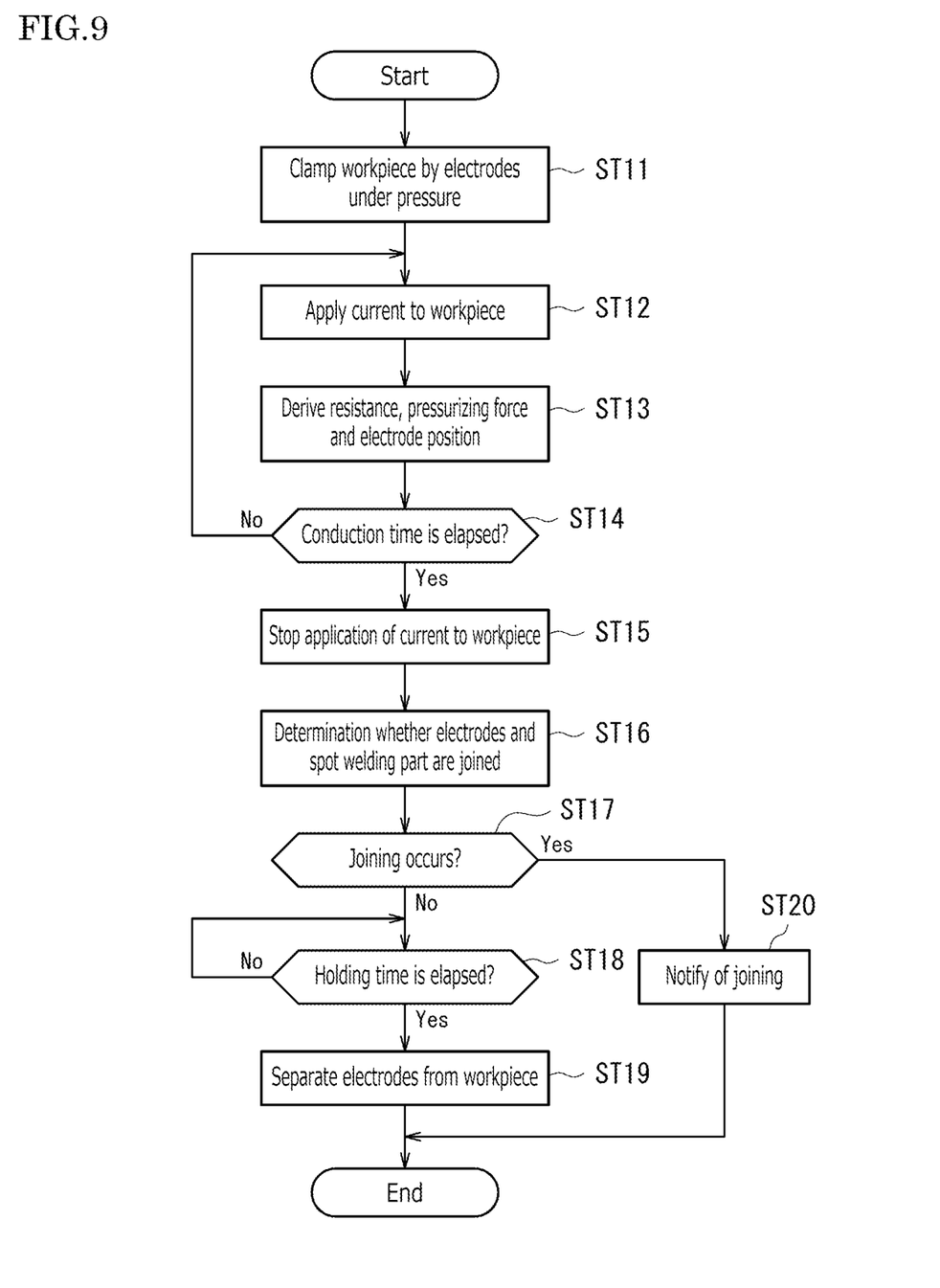
FIG. 9 is a flowchart for explaining operations of the spot welding equipment during the spot welding according to the second embodiment.

In step ST13 as shown in FIG. 9, the resistance, the pressurizing force and the electrode position are derived. Specifically, a voltage between the pair of electrodes 3 is measured by the voltage measurement section 81 while the welding current is measured by the current measurement section 82. Then, the resistance is calculated based on the measurement results by the voltage measurement section 81 and the current measurement section 82. Also, the pressurizing force applied by the pair of electrodes 3 is measured by the pressurizing force measurement section 83. Furthermore, the position of the upper electrode 3*a* is measured by the electrode position measurement section 84.

Also in step ST16, it is determined whether the joining of the spot welding part 150*a* to the electrode 3 occurs or not. This joining determination is performed using the above-described determination expressions (3) and (4). Specifically, the first index value is calculated by the resistance calculated in step ST13 and the master pattern of the resistance stored in the memory part 72. The first index value is an integrated value of the difference between the calculated resistance and the master pattern in the time period T1 (see FIG. 4). Also, the second index value is calculated by the pressurizing force measured in step ST13 and the master pattern of the pressurizing force stored in the memory part 72. The second index value is an integrated value of the difference between the measured pressurizing force and the master pattern in the time period T2 (see FIG. 5). Furthermore, the third index value is calculated by the electrode position measured in step ST13 and the master pattern of the electrode position stored in the memory part 72. The third index value is an integrated value of the difference between the measured electrode position and the master pattern in the time period T3 (see FIG. 8). Then, the determination value Y2 is calculated using the first index value, the second index value and the third index value. Thus, when the determination value Y2 is larger than the determination threshold n2, it is determined that the spot welding part 150*a* is joined to the electrode 3. When the determination value Y2 is not more than the determination threshold n2, it is determined that the spot welding part 150*a* is not joined to the electrode 3.

—Effects—

In the second embodiment as described above, in addition to the first index value related to the resistance as well as the second index value related to the pressurizing force at the time of the spot welding, the third index value related to the electrode position at the time of the spot welding is also calculated to use them to determine whether the joining occurs or not. Thus, it is possible to improve accuracy in the joining determination.

Other effects obtained by the second embodiment are the same as those in the first embodiment.

Other Embodiments

The foregoing embodiments are to be considered in all respects as illustrative and not limiting. The technical scope of the present invention is indicated by the appended claims rather than by the foregoing description, and all modifications and changes that come within the meaning and range of equivalency of the claims are intended to be embraced therein.

For example, in the first embodiment and the second embodiment, the workpiece 150 is constituted of three metal sheets 151. However, the present invention is not limited thereto. The workpiece may be constituted of two metal sheets, or may be constituted of more than three metal sheets.

Also in the first embodiment and the second embodiment, the metal sheet 151 is a steel sheet. However, the present invention is not limited thereto. The metal sheet may be an aluminum alloy sheet or the like. Also, the workpiece may be constituted of different kinds of metal sheets (for example, it may be constituted of a steel sheet and an aluminum alloy sheet).

Also in the first embodiment and the second embodiment, the first index value is an integrated value of the difference between the calculated resistance and the master pattern. However, the present invention is not limited thereto. The first index value may be a maximum value of the difference between the calculated resistance and the master pattern. The second index value and the third index value may also be defined in the same way as the first index value.

Also in the first embodiment, the starting time point t1 of the time period T1 for which the deviation in the resistance is obtained by integration is set at the same time as the starting time point t1 of the time period T2 for which the deviation in the pressurizing force is obtained by integration. However, the present invention is not limited thereto. The starting time point of the time period for which the deviation in the resistance is obtained by integration may be set at a time different from the starting time point of the time period for which the deviation in the pressurizing force is obtained by integration. Also in the second embodiment, the following three starting time points t1 are set at the same time point: the starting time point t1 of the time period T1 for which the deviation in the resistance is obtained by integration; the starting time point t1 of the time period T2 for which the deviation in the pressurizing force is obtained by integration; and the starting time point t1 of the time period T3 for which the deviation in the electrode position is obtained by integration. However, the present invention is not limited thereto. The respective starting time points as listed above may differ from one another.

In the second embodiment, the time period T2 for which the deviation in the pressurizing force is obtained by integration is the same time period as the time period T3 for which the deviation in the electrode position is obtained by integration. However, the present invention is not limited thereto. The time period for which the deviation in the pressurizing force is obtained by integration may be a different time period from the time period for which the deviation in the electrode position is obtained by integration.

Also in the first embodiment and the second embodiment, the time period T1 for which the deviation in the resistance is obtained by integration is shorter than the time period T2 for which the deviation in the pressurizing force is obtained by integration. However, the present invention is not limited thereto. The time period for which the deviation in the resistance is obtained by integration may be the same time period as the time period for which the deviation in the pressurizing force is obtained by integration. Also in the second embodiment, the time period T1 for which the deviation in the resistance is obtained by integration is shorter than the time period T3 for which the deviation in the electrode position is obtained by integration. However, the present invention is not limited thereto. The time period for which the deviation in the resistance is obtained by integration may be the same time period as the time period for which the deviation in the electrode position is obtained by integration.

Also in the first embodiment and the second embodiment, the application of the current is stopped after elapse of the conduction time. However, the present invention is not limited thereto. The application of the current may be stopped when predetermined cycles of application have been completed.

INDUSTRIAL APPLICABILITY

The present invention may be applicable to a welding determination method for determining the joining of a spot welding part formed in a workpiece to an electrode, and also applicable to spot welding equipment performing the welding determination method.

REFERENCE SIGNS LIST

3 Electrode
71 Control part (derivation part, determination part)

100 Spot welding equipment
150 Workpiece
150a Spot welding part
151 Metal sheet

What is claimed is:

1. A welding determination method for determining whether a spot welding part formed in a workpiece is joined to either or both of a pair of electrodes, wherein the workpiece made by laminating a plurality of metal sheets is clamped under pressure by the pair of electrodes so as to be melted by a current applied using the pair of electrodes, and after that the application of the current to the workpiece is stopped to hold the workpiece in a pressurized state, the welding determination method comprising the steps of:

deriving resistance between the pair of electrodes as well as pressurizing force by the pair of electrodes at a time of applying the current to the workpiece using the pair of electrodes;

deriving an electrode position at the time of applying the current to the workpiece using the pair of electrodes; and determining whether the spot welding part is joined to either or both of the pair of electrodes based on a first index value calculated using the derived resistance and a predetermined resistance, and also based on a second index value calculated using the derived pressurizing force and a predetermined pressurizing force, wherein the first index value is an integrated value of a difference between the derived resistance and the predetermined resistance in a predetermined first time period, the second index value is an integrated value of a difference between the derived pressurizing force and the predetermined pressurizing force in a predetermined second time period, a third index value is an integrated value of a difference between the derived electrode position and a predetermined electrode position in a predetermined third time period, and it is determined whether the spot welding part is joined to either or both of the pair of electrodes based on the third index value calculated using the derived electrode position and the predetermined electrode position, in addition to the first index value and the second index value.

2. The welding determination method according to claim 1, wherein
the second time period is a same time period as the third time period while the first time period is shorter than the second time period and the third time period.

3. The welding determination method according to claim 1, wherein
it is determined whether the spot welding part is joined to either or both of the pair of electrodes when the application of the current to the workpiece is stopped and the workpiece is held in the pressurized state.

4. Spot welding equipment comprising a pair of electrodes applying a current to a workpiece made by laminating a plurality of metal sheets, wherein the workpiece is clamped under pressure by the pair of electrodes so as to be melted by a current applied by the pair of electrodes, and after that the application of the current to the workpiece is stopped to hold the workpiece in a pressurized state, so that a spot welding part is formed in the workpiece, the spot welding equipment further includes:

a first derivation part deriving resistance between the pair of electrodes as well as pressurizing force by the pair of electrodes at a time of applying the current to the workpiece using the pair of electrodes;

a second derivation part deriving an electrode position at the time of applying the current to the workpiece using the pair of electrodes; and a determination part determining whether the spot welding part is joined to either or both of the pair of electrodes based on a first index value calculated using the derived resistance and a predetermined resistance, and also based on a second index value calculated using the derived pressurizing force and a predetermined pressurizing force, wherein the first index value is an integrated value of a difference between the derived resistance and the predetermined resistance in a predetermined first time period, the second index value is an integrated value of a difference between the derived pressurizing force and the predetermined pressurizing force in a predetermined second time period, a third index value is an integrated value of a difference between the derived electrode position and a predetermined electrode position in a predetermined third time period, and the determination part determines whether the spot welding part is joined to either or both of the pair of electrodes based on the third index value calculated using the derived electrode position and the predetermined electrode position, in addition to the first index value and the second index value.

* * * * *